F. LAIST & J. O. ELTON.
METHOD OF PURIFYING ZINC BEARING SOLUTIONS.
APPLICATION FILED JUNE 16, 1916.
1,255,434.
Patented Feb. 5, 1918.
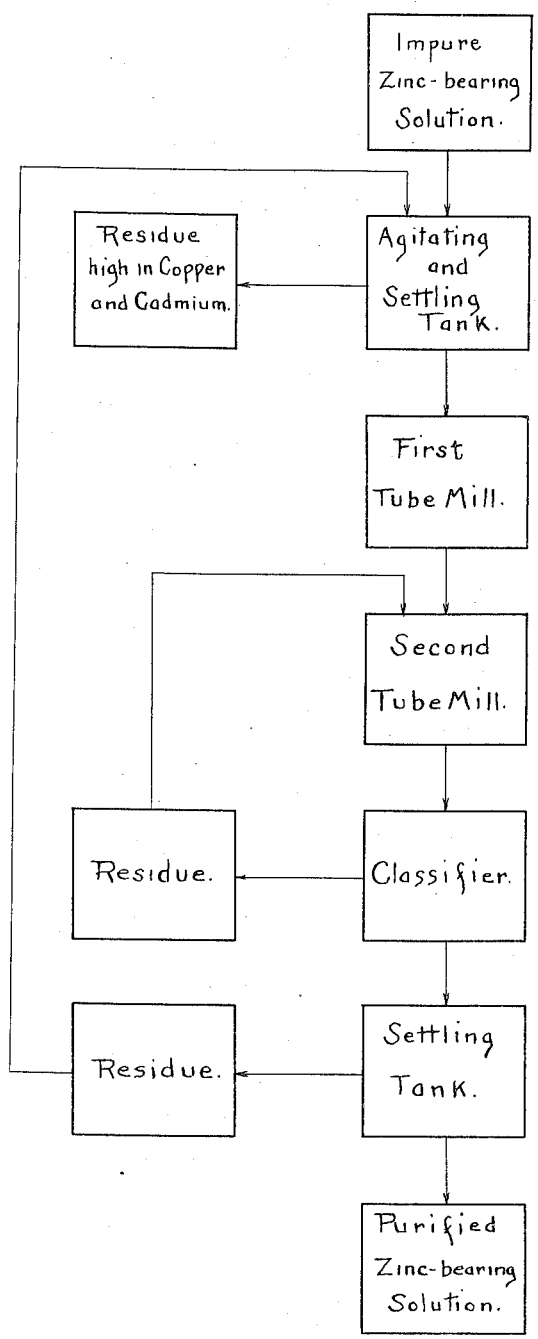

UNITED STATES PATENT OFFICE.

FREDERICK LAIST AND JAMES ORR ELTON, OF ANACONDA, MONTANA, ASSIGNORS TO ANACONDA COPPER MINING COMPANY, OF ANACONDA, MONTANA, A CORPORATION OF MONTANA.

METHOD OF PURIFYING ZINC-BEARING SOLUTIONS.

1,255,434. Specification of Letters Patent. Patented Feb. 5, 1918.

Application filed June 16, 1916. Serial No. 104,082.

*To all whom it may concern:*

Be it known that we, FREDERICK LAIST and JAMES ORR ELTON, citizens of the United States, residing at Anaconda, in the county of Deerlodge and State of Montana, have invented certain new and useful Improvements in Methods of Purifying Zinc-Bearing Solutions, of which the following is a specification.

It is well known that metallic zinc is capable of precipitating copper, cadmium and other metals electro-negative to zinc, and this method is commonly applied as a step in the purification of zinc-bearing solutions. However, it has been necessary in practice to employ a large excess of metallic zinc above that theoretically required to replace the more electro-negative metals. This practice results in an excessive wastage of zinc. Tube mills using zinc balls, shot or granules have been found to remove copper rather slowly, necessitating a low rate of flow of the solution to be purified.

The present invention is a method whereby the efficiency of zinc in a purification system of this kind is greatly enhanced.

In the preferred embodiment of the invention, we increase the capacity of the tube or ball mill by placing in advance of this mill in the purifying system, an agitating and settling tank for effecting a preliminary purification by means of zinc dust or other finely divided material containing metallic zinc. This accomplishes a quick removal of the larger part of the copper. The solution is then permitted to settle, and the clear solution is drawn off into a tube mill containing zinc balls or shot, the flow through this mill being maintained at a far higher rate than would be possible had a portion of the copper not been removed.

The tube mill containing the zinc balls or shot discharges its liquid contents into a second tube mill containing zinc in a relatively finer state of subdivision (shot or small fragments). This mill in turn discharges into a shallow box or classifier, which overflows into a settling tank. The fragments of zinc-bearing material which settle out in the classifier are returned to the head of the second tube mill, along with the discharge from the first tube mill. The zinc-bearing material caught in the settling tank which follows the second tube mill is more finely subdivided, and is returned to the combination agitating and settling tank at the head of the first tube mill, where it is used to remove a portion of the copper, cadmium and so forth from the solution passing to the first tube mill.

The accompanying drawing is a diagrammatic illustration of the steps as above described, constituting an illustrated embodiment of the invention.

It will be observed that our purifying system, in its preferred embodiment, involves subjecting the flowing solution to the action of successive bodies of zinc-bearing material, the portions of zinc which are carried forward by the stream of solution being collected and returned to the system at a point or points preceding, in the line of flow, the point or points of collection.

We claim:—

1. In the purification of zinc-bearing solutions, the steps which consist in subjecting the solution to the action of successive bodies of material containing metallic zinc, collecting zinc-bearing material carried forward by the solution, and returning the same to a preceding stage of the purifying operation.

2. In the purification of zinc-bearing solutions, the steps which consist in agitating the solution in the presence of finely divided zinc to precipitate copper, further purifying the solution by contact with zinc surfaces, collecting zinc-bearing material from the solution, and returning the same to a preceding stage of the purifying operation.

3. In the purification of zinc-bearing solutions, the steps which consist in agitating the solution in the presence of finely divided zinc to precipitate a portion of the copper, and further purifying the solution by contact with zinc surfaces in a tube mill.

4. The method of purifying zinc-bearing solutions which consists in agitating the same with finely divided zinc, subjecting the partially purified solution to the action of moving zinc surfaces, collecting the zinc-bearing material carried forward by the solution, and returning the same to the purifying system at the agitating stage.

In testimony whereof, we affix our signatures.

FREDERICK LAIST.
JAMES ORR ELTON.